(12) United States Patent
Aniolek et al.

(10) Patent No.: US 7,575,793 B2
(45) Date of Patent: Aug. 18, 2009

(54) RADIAL CELL CERAMIC HONEYCOMB STRUCTURE

(75) Inventors: Kenneth William Aniolek, Painted Post, NY (US); Douglas Munroe Beall, Painted Post, NY (US); Priyank Paras Jain, Corning, NY (US); Kenneth Richard Miller, Addison, NY (US); Seth Thomas Nickerson, Elmira, NY (US); Alan Thomas Stephens, II, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 317 days.

(21) Appl. No.: 11/394,694

(22) Filed: Mar. 31, 2006

(65) Prior Publication Data

US 2007/0231533 A1  Oct. 4, 2007

(51) Int. Cl.
*B32B 3/12* (2006.01)
*B32B 3/20* (2006.01)
*B32B 3/26* (2006.01)
*B01B 39/06* (2006.01)
*B01D 46/00* (2006.01)
*B28B 11/16* (2006.01)
*B29C 47/00* (2006.01)

(52) U.S. Cl. .................. 428/116; 428/188; 428/304.4; 55/523; 55/529; 264/177.12; 264/630

(58) Field of Classification Search .......... None
See application file for complete search history.

(56) References Cited

U.S. PATENT DOCUMENTS

| 3,963,504 | A |   | 6/1976  | Lundsager ............... 106/41 |
|-----------|---|---|---------|----------------------------------|
| 4,054,702 | A |   | 10/1977 | Lundsager et al. ........ 428/167 |
| 4,304,585 | A |   | 12/1981 | Oda et al. ................. 65/43 |
| 4,363,644 | A |   | 12/1982 | Sato et al. ............... 55/523 |
| 4,416,675 | A | * | 11/1983 | Montierth ................ 55/502 |
| 4,877,670 | A |   | 10/1989 | Hamanaka ............... 428/116 |
| 4,953,627 | A | * | 9/1990  | Ito et al. .................. 165/8 |
| 5,641,332 | A |   | 6/1997  | Faber et al. ............... 55/523 |
| 5,873,998 | A |   | 2/1999  | Grangeon et al. ....... 210/321.78 |

(Continued)

FOREIGN PATENT DOCUMENTS

EP      0 225 402      11/1985

(Continued)

*Primary Examiner*—David R Sample
*Assistant Examiner*—Nicole T Gugliotta
(74) *Attorney, Agent, or Firm*—Matthew B. McNutt

(57) ABSTRACT

A radial cell ceramic honeycomb structure is provided that is particularly adapted for use as a catalytic carrier or a particulate filter in an automotive or diesel exhaust system. The honeycomb structure includes a network of interconnected webs having a central axis. The network of webs includes radial webs of varying lengths, only some of which substantially extend the entire radial length of the network, and tangential webs that intersect to define rings of gas-conducting radial cells, and a rounded outer skin that surrounds the cells formed by the interconnected webs. The radial webs extending to the periphery of the network join an inner edge of the outer skin in a substantially orthogonal orientation to reduce thermally generated stresses and to increase strength of the resulting structure. The number of radial webs in the network changes along the radial length at transition zones that are defined by one of the tangential webs such that a desired cell density is achieved across the network.

10 Claims, 5 Drawing Sheets

U.S. PATENT DOCUMENTS

| | | | |
|---|---|---|---|
| 5,952,079 A | 9/1999 | Andou et al. | 428/116 |
| 6,391,421 B1 | 5/2002 | Brück et al. | 428/116 |
| 6,508,852 B1 | 1/2003 | Hickman et al. | 55/523 |
| 2004/0266619 A1 | 12/2004 | Bernas et al. | 502/527.21 |
| 2005/0235622 A1 | 10/2005 | Cutler et al. | 55/523 |

FOREIGN PATENT DOCUMENTS

| | | |
|---|---|---|
| EP | 0 336 106 | 2/1989 |
| EP | 1 570 898 | 11/1999 |
| JP | 54-110189 | 8/1979 |
| WO | 2007/033921 | 3/2007 |

\* cited by examiner

RADIAL CELL CERAMIC HONEYCOMB STRUCTURE

FIELD OF THE INVENTION

This invention generally relates to ceramic honeycomb structures of the type used in automotive or diesel exhaust systems, and is specifically concerned with honeycomb structures having cells formed from interconnected radial and tangential web walls.

BACKGROUND OF THE INVENTION

Ceramic honeycomb structures are known in the prior art. Such structures generally comprise a plurality of interconnected web walls that form a matrix of gas-conducting cells which are typically square or hexagonal in shape, and a cylindrical outer skin surrounding the cell matrix. The outer edges of the matrix of web walls is integrally joined to the inner edge of the outer skin to form a single, unitary structure, which is usually cylindrical in shape.

Such ceramic honeycomb structures find particular application as either particulate filters in diesel exhaust systems, or as catalyst substrates for automobile exhaust systems. Hence these structures have an inlet end for receiving exhaust gases, and an outlet end for expelling these gases. Ceramic honeycomb structures used as diesel particulate filters typically have a cell density of between 100 and 400 cells per square inch, and webs on the order of 12-20 mils thick. The inlets and outlets of the matrix of gas-conducting cells are plugged in a "checkerboard" pattern on the inlet and outlet ends of the structure to force the diesel exhaust gases through the porous ceramic material forming the web walls, thereby filtering out the particulate soot generated within the exhaust of diesel engines. In order to maintain the gas-permeability of such a honeycomb structure, it is necessary to periodically burn-off the particulate material that accumulates on the inlet-side of the webs forming the gas-conducting cells. Hence, the inlet cells are periodically exposed to a hot flame in a "burnout cycle" designed to ablate the accumulated particles of soot. The central webs of a ceramic honeycomb structure used as a diesel particulate filter may be raised to a temperature of 1100° C. during such a burn-out cycle, while the outer skin is heated to only about 500° C. The resulting 500+° C. thermal gradient creates thermal stresses in the ceramic honeycomb that can cause cracks and other discontinuities, primarily in the outermost cells which contact the inner edge of the outer skin.

When such ceramic honeycomb structures are used as ceramic catalyst substrates, the cells are not plugged as with diesel particulate filters and gases are allowed to pass straight through the gas-conducting cells. The cell density is made higher (i.e., about 300-900 cells per square inch) in order to maximize the area contact between the automotive exhaust gases which blow directly through the gas conducting cells, and the web walls. To reduce the pressure drop that the exhaust gases create when flowing through the honeycomb structure, the web walls are rendered thinner than in structures used for diesel particulate filters, i.e. on the order of 2-6 mils. The use of such thinner walls further advantageously reduces the light-off time (i.e., the time it takes before the webs reach the required 250° C. before the catalyst impregnated within the web walls begins to effectively remove $NO_x$ and other unwanted pollutants from the exhaust gases). The frequent rapid heating of such structures from ambient temperature to 250° C. whenever the automotive vehicle is started likewise generates a substantial thermal gradient across the diameter of the honeycomb structure. These thermally induced stresses are maximized at the interface between the thin web walls and the outer skin of the honeycomb structure.

In both the cases where a ceramic honeycomb structure is used as diesel particulate filter, or as a catalytic substrate, the applicants have observed that the thermally induced stresses occurring at the interface between the cell matrix and the inner edge of the outer skin are exacerbated by the frequently oblique orientation between the web walls, and the outer skin. Such an oblique orientation is a result of the imposition of a circular or rounded outer skin around a matrix of square or hexagonal cells, which necessarily causes some of the web walls to join the outer skin at an angle, such as of 45° and less. To solve these problems, several honeycomb structures employing a combination of radial and tangential webs have been proposed in the prior art. The advantages of such designs are the elimination of webs on the outer edges of the honeycomb matrix that join the inner edge of the outer skin at oblique (non-orthogonal) angles. The resulting substantially orthogonal orientation between the outer edges of the radial web walls and the inner edge of the outer skin reduces the stresses produced by heat gradients. However, such known radial-web designs include (1) "wagon wheel" configurations having an interior portion formed from a matrix of square cells, and a peripheral portion formed from a single, tangential layer of radial cells is created between a single, cylindrical wall and a plurality of short, radially oriented webs that form the side walls of the cells, or (2) a stacked radial cell configuration wherein each of the radial webs extends substantially the length of the radius between the centroid and the inner edge of the outer skin, or (3) an imbricated radial cell configuration cell configuration having rings of staggered radial cells where each radial web extends only the length of a ring of cells.

Unfortunately, the applicants have found that all of these designs have shortcomings. While the "wagon wheel" design has been found to ameliorate the stress problem between the cell webs and the outer skin, it tends to transfer these stresses to the interface between the outer edges of the cell matrix and the inner edge of the cylindrical wall that forms the inner wall of the ring of radial cells. While the second radial design employing radius-length walls avoids the stress or displacement problem associated with the "wagon wheel" design, it inherently creates an unacceptably high cell density near the center of the cell matrix, where the radial webs simultaneously converge. This, in turn, generates an unacceptably high pressure drop across the honeycomb structure. Additionally, such a structure is difficult, if not impossible to manufacture via conventional extrusion techniques, as the convergence of the web walls at the center of the matrix creates disparities in the flow rate of extruded ceramic material that in turn distort or weaken the final structure. While the imbricated radial cell design solves the aforementioned high cell density and manufacturing problems, it is unacceptably weaker in its interior than conventional designs using square or hexagonal cells.

Accordingly, there is a need for a radial cell ceramic honeycomb structure that maintains the stress-reducing advantages associated with an orthogonal interface between the outer web walls of the cell matrix and the inner edge of the outer skin, but avoids the stress-displacement, high cell density and interior weakness problems associated with prior art radial cell designs. Ideally, such a radial cell honeycomb structure would either maintain a desired cell density across the diameter of the honeycomb structure, or reduce the density of the cells near the outer perimeter of the structure to promote hot gas flow more toward the periphery, thereby reducing the thermal gradient and hence thermal stresses. It would be desirable if such a radial cell honeycomb had improved compressive strength to better withstand the exterior stresses applied to such structures during the manufacturing process. Finally, such a structure should also have improved strength for handling the stresses that occur as a result of the heat up and cool down cycles of the honeycomb structure which occurs after the burnout cycle in a diesel particulate filter, or engine start up and shut-off in a catalytic carrier.

SUMMARY OF THE INVENTION

Generally speaking, the invention is a radial cell ceramic honeycomb structure that solves or at least ameliorates all of the aforementioned problems. To this end, the ceramic honeycomb structure comprises a plurality of interconnected walls that define a plurality of cells of a honeycomb network having a central axis across its cross section, including radial webs of varying length that diverge from one another in a radial direction away from said central axis, and at least two tangential webs arranged around the central axis wherein at least some of the radial webs extend substantially the length between the central axis and the periphery of the network. The honeycomb network may be cylindrical in shape and covered by a tubular outer skin and each of the radial webs that extends to the periphery of the network may have an outer end that joins an inner edge of the outer skin at a substantially orthogonal orientation. In such a case, the radial webs diverge from a centroid located in the center of the cross section of the network. Alternatively, the honeycomb structure may have an elliptical oval or "race track" cross section, such that the radial webs diverge from a central axis. In such a case, the radial webs will join an inner edge of the skin in either an orthogonal or substantially orthogonal orientation. The orthogonal joints between the radial webs and the inner edge of the outer skin eliminates the stresses associated with prior art honeycomb structures caused by an oblique orientation of some of the web walls that join the inner edge of the outer skin in square, hexagonal, or other polygonal cell designs. The provision of at least some radial webs that extend substantially the length of the radius of the network renders the resulting structure stronger than designs utilizing short radial webs in imbricated patterns.

To avoid a disadvantageously high density of cells toward the centroid of the structure, only some of the radial webs extend from the centroid to the inner edge of the outer skin. The number of radial webs changes at selected radial distances between the outer skin and the centroid such that a selected average cell density in selected annular portions of the structure is substantially maintained. These selected radial distances correspond to transition zones, and each transition zone is defined by one of the tangential webs. The tangential webs are located along the selected radial distances where the number of radial webs is reduced, for example by half or ⅓, ¼, etc. Preferably, the transition webs are made stronger than the balance of the tangential webs in order to reduce the stresses in this region of the ceramic honeycomb structure. The number of radial webs may decrease in the direction toward the centroid in order to maintain a desired average density of cells along the radius. Alternatively, the number of radial webs may decrease in the outer periphery of the network such that larger cells are formed near the periphery to promote the flow of exhaust gas in this region.

The radial cell ceramic honeycombs of the invention are particularly adapted for use as either a catalytic carrier in an automotive exhaust system, or as a particulate filter in a diesel exhaust system, and both embodiments of the invention are advantageously compatible with conventional manufacturing techniques.

DESCRIPTION OF THE DRAWINGS

FIG. 1A is a perspective view of a prior art ceramic honeycomb structure of which the invention is applicable to.

DETAILED DESCRIPTION OF THE PREFERRED EMBODIMENTS

Figure 1A:
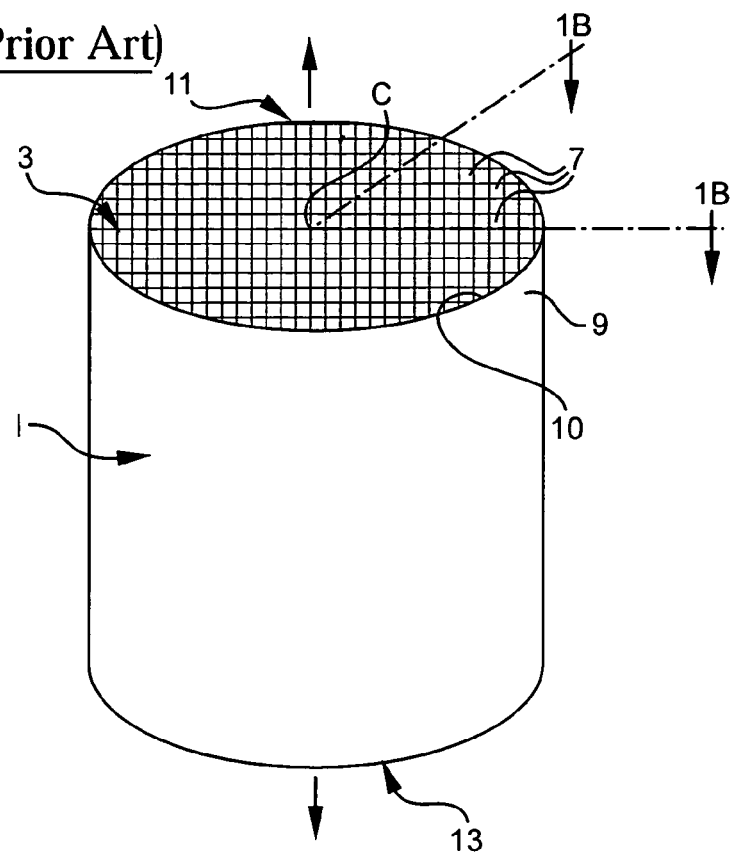
Figure 1B:
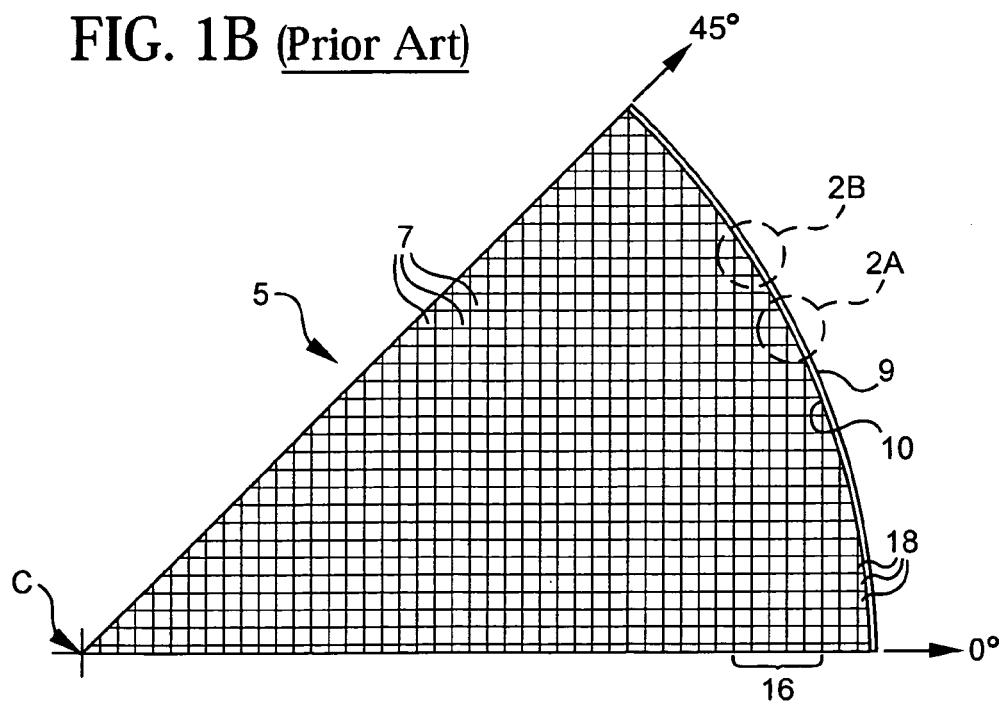
FIG. 1B is a plan view of an octant section of the honeycomb structure of FIG. 1A along the section lines 1B-1B.

With reference now to FIGS. 1A and 1B, wherein like numerals designate like components throughout all the several figures, the honeycomb structure 1 that the invention may be applied to includes a plurality of interconnected web walls 3 that form a network 5 of gas conducting cells 7. While these cells 7 are illustrated of having a square cross section, the invention is applicable to honeycomb structures having cells with hexagonal, octagonal or other polygonal cross sections. The honeycomb structure further includes an outer skin 9 having a cylindrical or rounded shape that encloses the sides of the network 5 of cells 7. The honeycomb structure 1 further includes an inlet end 11 for receiving either diesel or automotive exhaust gases, and an outlet end 13 for expelling these gasses.

When the ceramic honeycomb structure 1 is used as a diesel particulate filter, the web walls are typically between about 10 and 25 mils thick and the outer skin 9 is about 3 to 4 times the thickness of the wall. While not illustrated in the figures, the cells 7 of the filter are preferably plugged in a checkerboard pattern across both the inlet and outlet ends 11, 13 to force the diesel exhaust to pass through the web walls 3 in an "s" pattern before being expelled out the outlet end 13. In such an application, cell density is typically between about 100 and 400 cells per square inch. When the honeycomb structure 1 is used as a catalytic carrier substrate, the web walls 3 are thinner, being on the order of 2 to 6 mils thick. Additionally, the outer skin 9 is about 3-4 times the thickness of the wall, and the cell density is higher, ranging between about 300 and 900 cells per square inch. Automotive exhaust gas entering the inlet end 11 passes straight through the gas conducting passages defined by the cells 7.

Whether the honeycomb structure 1 is used as a diesel particulate filter or a catalytic carrier, it is manufactured by extruding a porous ceramic material such as cordierite, silicon carbide, mullite, or aluminum titanate. In both cases, the outer skin 9 is thicker than the web walls in order the give the structure 1 the physical strength necessary to withstand the forces applied to it during the manufacturing process, and during the "canning" of the structure within an exhaust system.

Figure 2A:
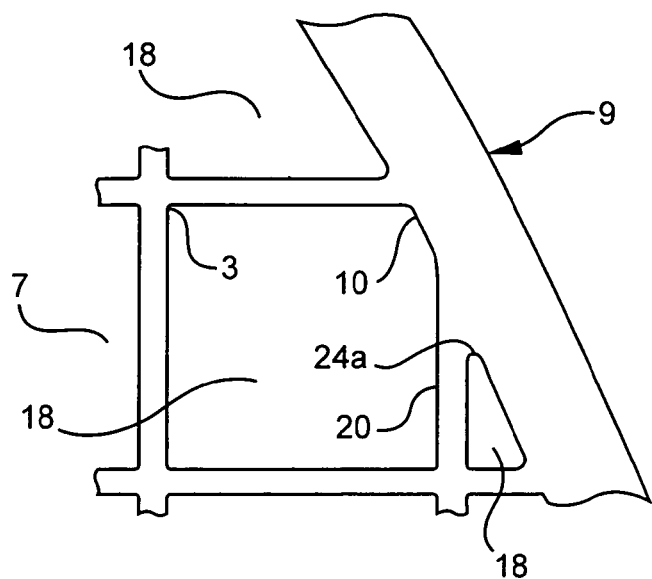
FIG. 2A is an enlarged, finite element analysis of the uppermost circled area of FIG. 1B, illustrating the stress concentrations at the joint between an obliquely orientated web, and the inner edge of the outer skin of the structure.
Figure 2B:
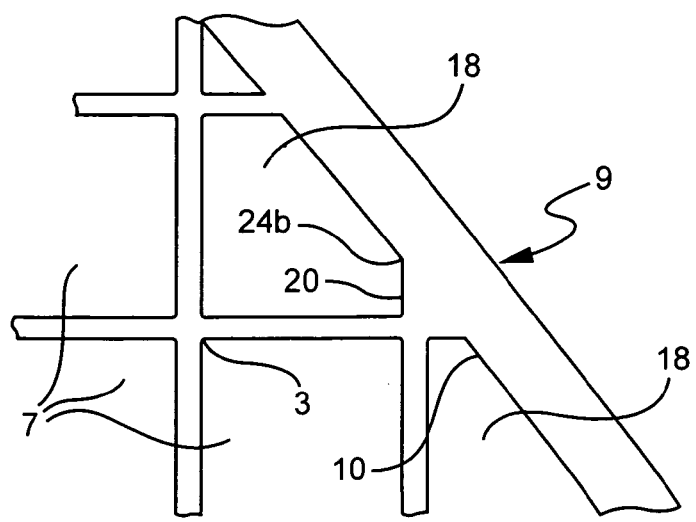
FIG. 2B is an enlarged, finite element analysis illustrating the stress concentration associated with the joint between another obliquely orientated web, and the inner edge of the outer skin of the structure.

The applicants have observed that the prior art honeycomb design of figures 1A and 1B is apt to fracture at the interface between the inner edge 10 of the outer skin 9, and the outer edges of the network 5 of cells 7. The applicants have discovered that the crack-inducing stresses are also largely generated as a result of the generally oblique orientation of some of the web walls 3 that are integrally joined to the inner edge 10 of the outer skin 9. These stresses are best appreciated with respect to the finite element analysis illustrated in FIGS. 2A and 2B. These drawings are enlargements of the phantom circles designated as "2A" and "2B" in FIG. 1B. As is easily seen in both of these drawings, the cells immediately adjacent to the outer skin 9 are partial cells 18 which have webs 20 which are oriented obliquely (i.e., at angles of 45 degrees or less) in the areas where they join the inner edge 10 of the outer skin 9. Hence, when radially oriented forces are applied between these obliquely oriented webs 20 in the outer skin 9, forces are generated that create areas of maximum stress 24a and 24b illustrated in FIGS. 2A and 2B, respectively. Such radially-oriented forces may be generated by compressive forces applied by the outer skin 9 against the webs 20 as a result of the handling of the structure 1 during manufacture, or from the network 5 of cells pushing against the inner edge 10 of the outer skin 9 as a result of thermal differential expansion during either a burn-out cycle or the initial conduction of hot exhaust gases through the center of the structure 1 at engine start-up. As will be discussed in more detail hereinafter, applicants have observed that these stresses are larger near a rotational angle of 45 degrees (and multiples thereof) around the circumference of the ceramic honeycomb structure 1 which, of course, corresponds to the areas of greatest obliquity in the orientation between the webs 20 of the partial cells 18 and the inner edge 10 of the outer skin 9.

Figure 3:
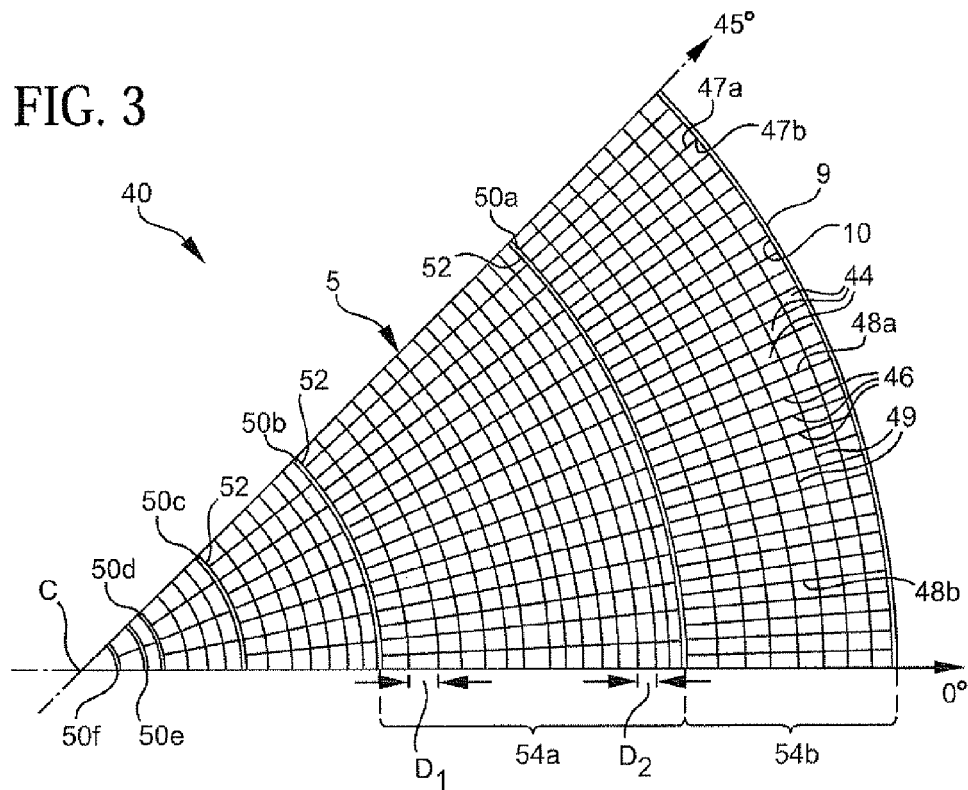
FIG. 3 is a plan view of an octant section of a first embodiment of the invention.

FIG. 3 illustrates a preferred embodiment of the invention, which is a cylindrical ceramic honeycomb structure 40 wherein all of the cells defined by the interconnected web walls are radial cells 44. In this embodiment, the network 5 of ceramic webs includes radial webs 46 of varying lengths, each of which has an outer end 47a that joins the inner edge 10 of the outer skin 9 in a generally orthogonal joint 47b. Some of the radial webs 48a extend almost completely the radial distance between the centroid C of the structure 40 and the outer skin 9, while other radial webs 48b extend only through a peripheral section of the structure 40. However, all of the radial webs 46 in this embodiment join with the inner edge 10 of the outer skin 9 in the generally orthogonal joint 47b as previously described. The network 5 of webs in the structure 40 further includes a plurality of tangential webs 49 that are concentrically disposed around the centroid C and are mutually parallel along an axial length thereof. The radial cells 44 are defined between the radial webs 46 and tangential webs 49 wherein the radially extending walls are defined by the radial webs 46 and the tangentially extending walls are defined by the tangential webs 49.

Figure 4:
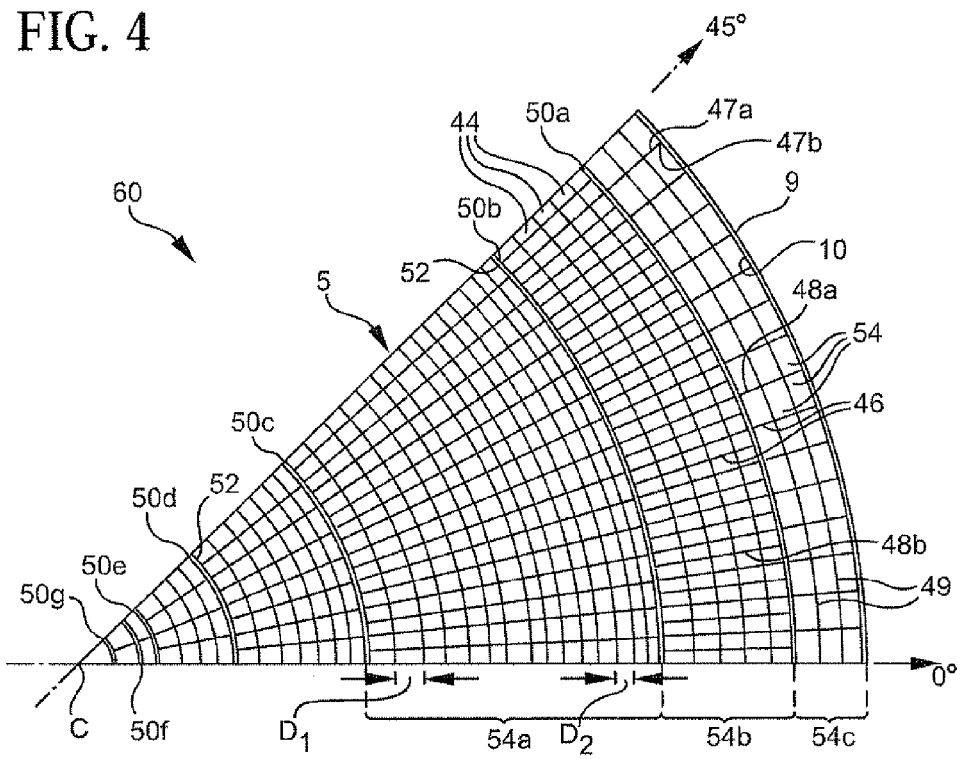
FIG. 4 is a plan view of an octant section of a second embodiment of the invention.

In order to maintain a generally uniform cell density between, for example, inner and outer peripheral zones 54a and 54b, the number of radial webs 46 is reduced along selected points 50a through 50f known as "transition zones" along the radius of the structure 40. At these transition zones 50a-50f, the number of radial webs 46 is reduced by ½, ⅓, or ¼, etc. Reduction by ½ is preferred and is illustrated in FIGS. 3 and 4. The transition zone at any one of the selected points 50a-50f is defined by the particular tangential wall 49 that intersects with the selected point in the radius. In order to maintain uniformity of the cross sectional area of the radial cells 44 in each of the tangential zones 54a, 54b of the structure 1 disposed between the transition zones, the distance between the tangential webs 49 may change in the direction between the centroid C and the outer skin 9. For example, compare $D_1$ and $D_2$, illustrating that the spacing decreases the closer in radial proximity to the skin 9. Such closer spacing of the webs 49 compensates for the tangential widening of the cells 33 caused by the angular divergence between adjacent radial webs 46 as they radiate from the centroid C of the structure 40. Accordingly, the cross sectional area of at least some of the radially spaced cells 44 may be made to have substantially uniform cross sectional area. At each of these radial points 50a through 50f, a reinforced tangential web 52 may be provided which is substantially thicker than the balance of the tangential webs 49. For example, if the thickness of the radial webs 46 and tangential webs 49 is 4.5 mils, the thickness of each reinforced tangential web 52 should be on the order of 8.0 mils. As will be discussed in more detail with respect to FIG. 6, the thickening of the tangential webs 52 advantageously reduces stresses generated on these walls from forces resulting from the presence of lesser numbers of radial webs 46 on its interior side towards the centroid C as on its exterior side toward the outer skin 9.

The reduction (e.g., halving) of the number of radial webs 46 toward the centroid C of the structure 40 eliminates a dense convergence of the radial webs, which not only allows a selected average cell density to be substantially maintained across the radius of the structure 42, but further allows this embodiment of the invention to be relatively easily manufactured via conventional ceramic extrusion techniques. To further strengthen the network 5 of web walls, each of the interior web intersections may include a fillet. The fillet radius is preferably about 5.0 mils, but will significantly vary with other configurations. Optionally, fillets may be included only at some or all of the transition zones 50a-50f between the radial webs 46 and the transition webs 52 to further reinforce and strengthen these zones.

FIG. 4 illustrates an octant section of an alternate embodiment of the invention. This embodiment is in all respects identical to the embodiment described with respect to FIG. 3, with the exception that every other radial web 46 has been removed from the network 5 in the most peripheral zone 54c, such that the resulting radial cells 54 are twice as large as the balance of the radial cells 44 in the network 5. Hence, in this embodiment, the number of radial webs 46 actually decreases in the radial direction toward the outer skin 9, in contrast to the FIG. 3 embodiment wherein the number of radial webs 46 increases at all points along the radius toward the outer skin 9. The reduction of radial webs 46 in the outermost peripheral portion 54c promotes a larger flow of exhaust gases toward the periphery of the alternate embodiment 60, which thereby reduces the heat gradient across the radius of the ceramic substrate 60 in order to reduce thermally-induced stresses which can sometimes lead to undesirable cracking or breakage.

Figure 5:
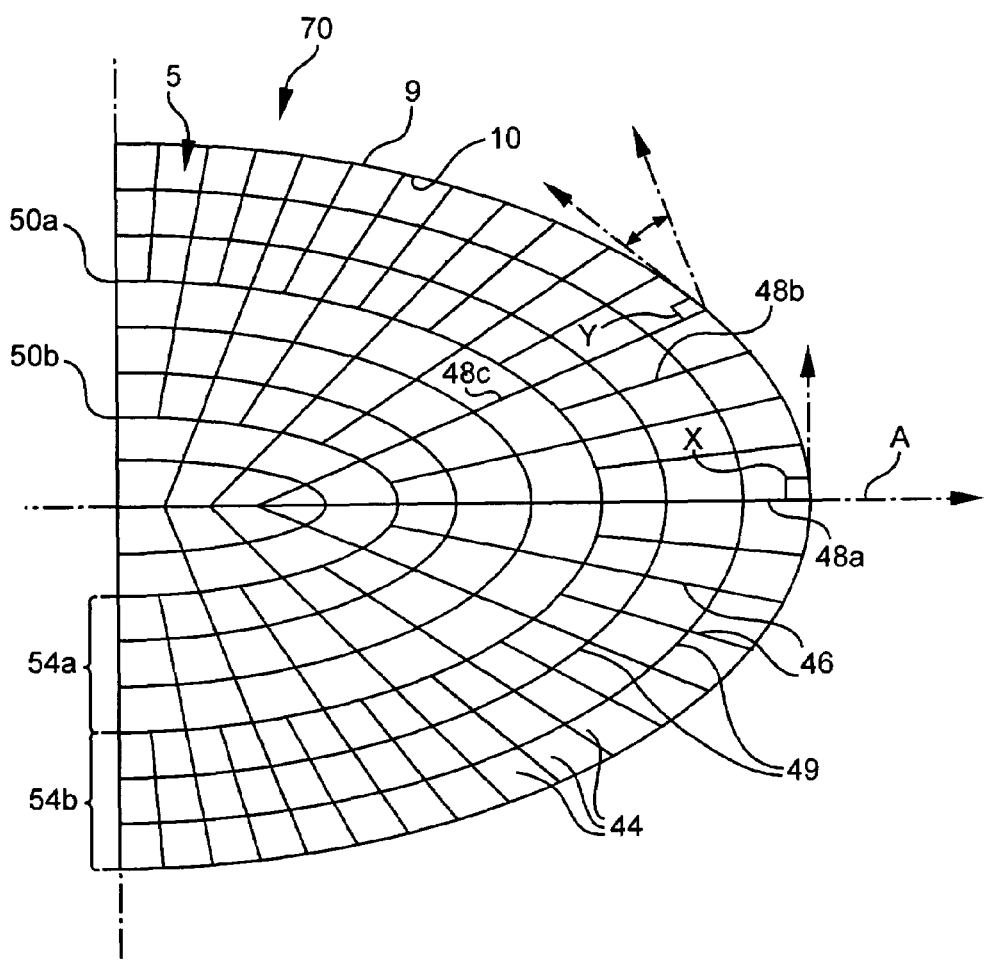
FIG. 5 is a half cross section of a third embodiment of the invention having an elliptical cross section.

While the embodiments 40, 60 are illustrated as having cylindrical outer shapes with a centroid C that corresponds to an axis of rotation, the invention also encompass ceramic honeycomb structures having other curved shapes, such as the structure 70 having an elliptical cross-section illustrated in FIG. 5 (two quadrants shown). Structure 70 has a central axis A that intersects with the two foci (not shown) of the elliptical shape, and all of the radial webs 46 diverge from one another and extend away from the central axis A as shown. As with the previously described embodiments, the embodiment 70 illustrated in FIG. 5 includes radial webs 46 of varying lengths and the number of cells 44 is reduced at least a certain points in the radial direction. For example, radial web 48a extends the entire radial length of the network 5 of webs, while radial web 48b extends along only the peripheral group of webs 54b. Tangential webs 49 are further provided, and the tangential webs 50a, 50b defining transition zones are rendered stronger by, for example, providing an increased thickness therein. The transition webs 50a, 50b may be also made stronger, for instance, by web tapering at the junction of the transition web and the radial web, i.e., tapering the radial wall to include a larger taper approaching the transition web, or by providing fillets at the radial web, transition web intersection, for example. While some of the radial webs 48a join the inner edge 10 of the outer skin 9 at a right angle "X", other radial webs (for example web 48c) joins the inner edge 10 of the outer skin 9 at an angle "Y" that is only substantially orthogonal (i.e., 90°±30°). Accordingly, the embodiment 70 of the invention does not have the uniform compressive strength characteristics 360° around its perimeter that the previously described embodiments 40, 60 do. Nonetheless, most of the advantages associated with the invention are present in the third embodiment 70 of the invention.

While not specifically shown in the Figures, the cross section of the honeycomb structure embodying the invention may also be oval or "race track" shaped. It should be noted that a honeycomb structure having a "race track" cross section would have similar uniform strength 360° around its periphery as the embodiments 40, 60 previously described, as all of the radial webs 46 could join with the inner edge 10 of the outer skin in a substantially orthogonal orientation.

Figure 6:
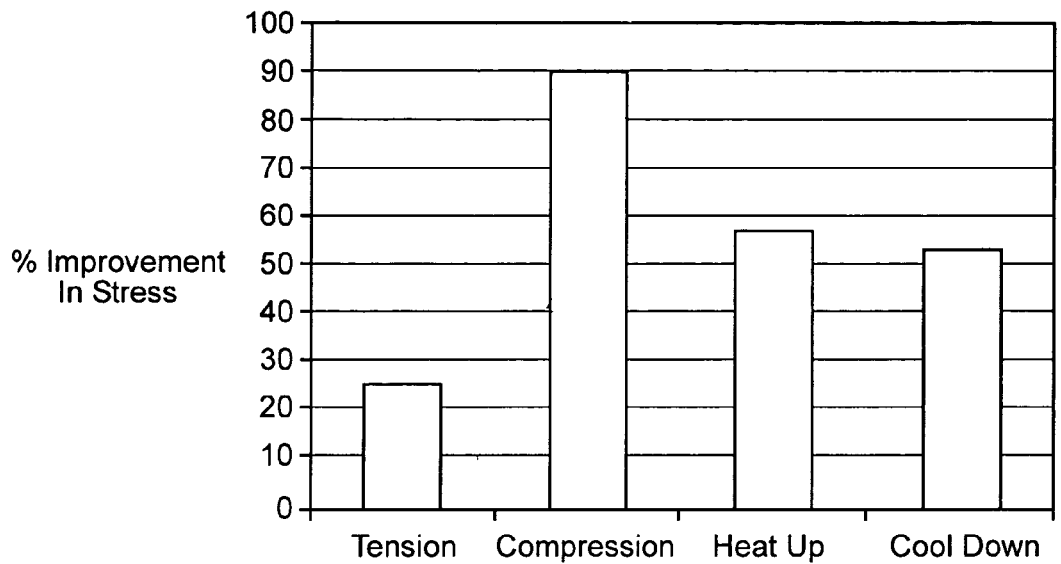
FIG. 6 is a bar graph that graphically displays the percentage improvement (simulated) of the inventive honeycomb structure over the prior art honeycomb structure illustrated in FIGS. 1A and 1B in resistance to radial tension, radial compression, heat up thermal load, and cool down thermal load.

FIG. 6 is a bar graph illustrating the percentage improvement in stress of the FIG. 3 embodiment 40 over the ceramic substrate 1 illustrated in FIGS. 1A and 1B. Here, it can be seen that the average stresses generated as a result of radial tension, radial compression, down-heat up load, and cool down thermal loading are substantially less (are improved) for the inventive ceramic honeycomb illustrated in FIG. 3 versus the prior art illustrated in FIGS. 1A and 1B. In particular, the invention exhibited a large average decrease in maximum stress over its 360° circumference, with greater than 20% improvement in all categories.

In all cases of comparative peripheral stresses generated by tension, compression, heat up and cool down thermal load, the stresses generated within the inventive structures is highly uniform between 0 degrees and 45 degrees. By contrast, the peripheral stresses generated within the prior art structure 1 oscillate around the circumference of the structure 1 to values that are multiples higher. These higher stress points correspond to the oblique orientation of some of the web walls in the vicinity of 45 degrees and multiples thereof. These indicate weak points in the prior art structure 1 that may be more prone to cracking or failure during either manufacture or operation. The inventive structures eliminate such oscillations in the stress patterns.

Figure 7:
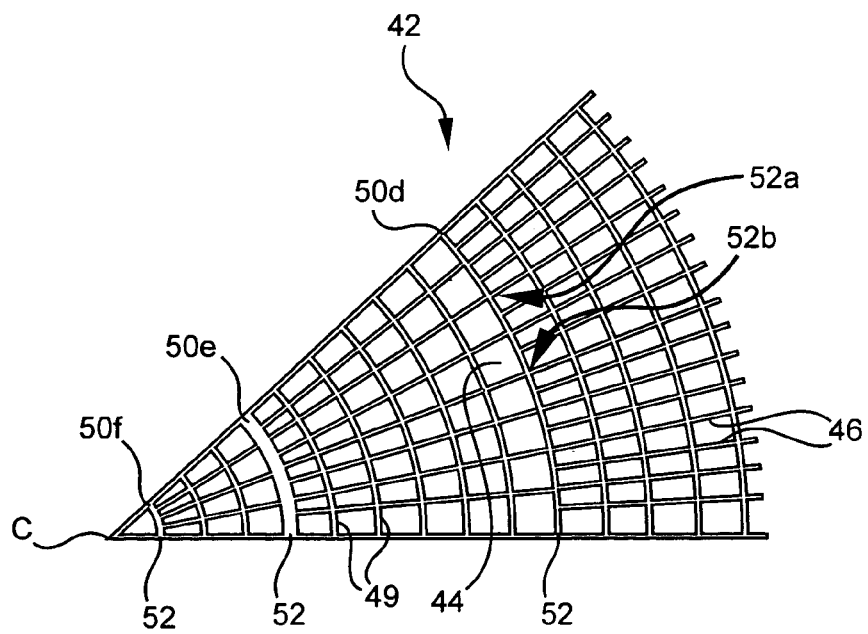
FIG. 7 is a finite element analysis illustrating the areas of maximum stress experienced by the several embodiments of the invention.

FIG. 7 is a finite element analysis of the intersection of an octant of the ceramic honeycomb structure 40 illustrating how the stresses are maximized at the transition zones within the structure 42 where the number or radial webs 46 is reduced (e.g., halved). In particular, stress is maximized at the points where radial webs 46 join the transition tangential webs (e.g., 50d-50f), thereby applying forces to the webs at these points (52a, 52b). As previously mentioned, to counteract these shear forces and reduce these stresses, the peripheral webs 50a-50f are rendered stronger by making them thicker than the normal (non-transitional) tangential webs 49 (although other strengthening techniques, such as fillets, or tapered radial webs could be optionally or additionally employed). These walls 52 may be 2 or more times as thick as the non-transitional webs 49.

While this invention has been described with respect to preferred embodiments, numerous variations, modifications and additions will become evident to persons of skill in the art. All such modifications, variations and additions are intended to fall within the scope of this invention, which is limited only by the claims appended hereto and their equivalents.

What is claimed is:

1. A ceramic honeycomb structure comprising:
a plurality of interconnected webs that define a plurality of cells in a honeycomb network having a central axis across its cross section, the plurality of interconnected webs comprising
radial webs of varying length and arranged so as to diverge from one another with respect to said central axis, wherein at least some of said radial webs extend substantially from said central axis to an outermost periphery of said network, and
tangential webs arranged concentrically with respect to the central axis,
wherein said honeycomb network includes transition zones, each of said transition zones is bounded by tangential transition webs, wherein the tangential transition webs are thicker than tangential webs within the transition zones, and wherein the number of radial webs changes in a radial direction at said tangential transition webs.

2. A ceramic honeycomb structure as defined in claim 1, wherein each of said radial webs has an end that defines said outermost periphery of said network and joins an inner edge of said outer skin in a substantially orthogonal orientation.

3. A ceramic honeycomb structure as defined in claim 1, wherein the number of radial webs is reduced at at least some of the transition zones in a radial direction toward said central axis.

4. A ceramic honeycomb structure as defined in claim 1, wherein at least some of the transition zones in a radial direction are reinforced by fillets, tapered radial walls, or tangential transition webs.

5. A ceramic honeycomb structure as defined in claim 1, wherein said tangential transition webs bordering said transition zones are stronger than the tangential webs within the transition zones.

6. A ceramic honeycomb structure as defined in claim 3, wherein the number of radial webs diminishes toward said central axis such that a selected average cell density across the network is substantially maintained.

7. A ceramic honeycomb structure as defined in claim 1, wherein the density of cells defined by said webs diminishes toward said periphery.

8. A ceramic honeycomb structure as defined in claim 1, wherein said cross section of said honeycomb network includes a centroid, and said radial webs diverge from said centroid.

9. A ceramic honeycomb structure as defined in claim 1, wherein said cross-section of said honeycomb network is circular, and said radial webs diverge from a center of said cross section.

10. A ceramic honeycomb structure, comprising:
a cylindrical outer skin; and
a plurality of interconnected webs contained within said outer skin that define a honeycomb network having a plurality of cells and a centroid within a cross section of said network, said webs comprising
  radial webs arranged in a radial direction with respect to said outer skin that join an inner edge of said outer skin in a substantially orthogonal orientation, wherein only some of said radial webs have a radial length that substantially corresponds to a radius of said cylindrical outer skin, and wherein the number of radial webs is reduced at selected transition zones along said radius in a direction toward said centroid, and
  tangential webs arranged concentrically with respect to said centroid, wherein tangential transition webs border each transition zone along said radius, and wherein each tangential transition web is stronger than all other tangential non-transition webs.

* * * * *